June 23, 1959    C. H. BERGQUIST    2,891,750
CABLE SUPPORTING SYSTEM
Filed Oct. 1, 1956    2 Sheets-Sheet 2
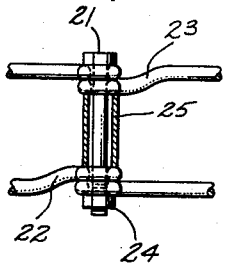
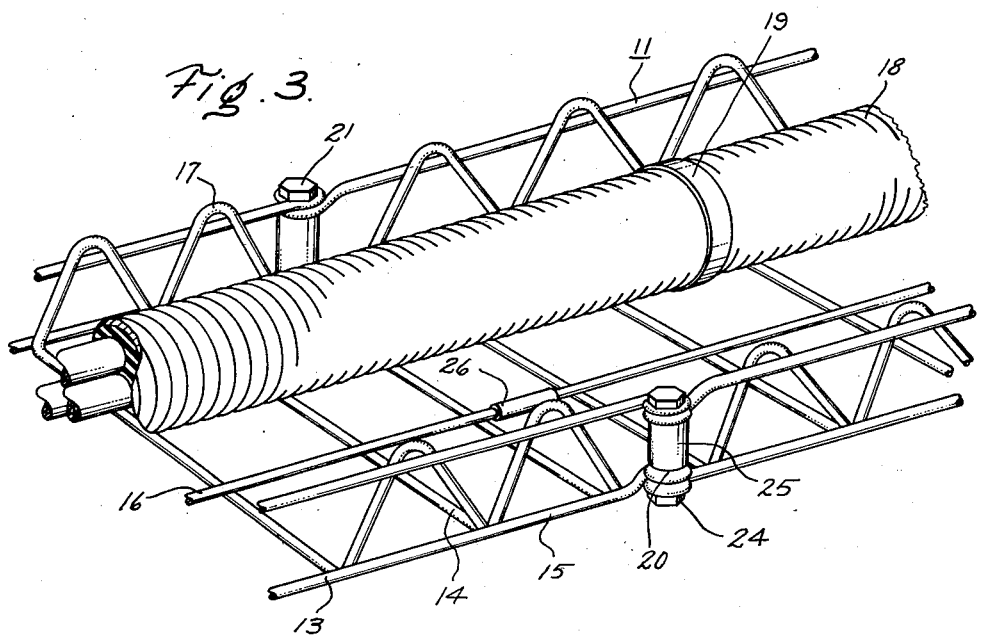
Inventor:
Carl H. Bergquist.
by Richard L Caslin
His Attorney

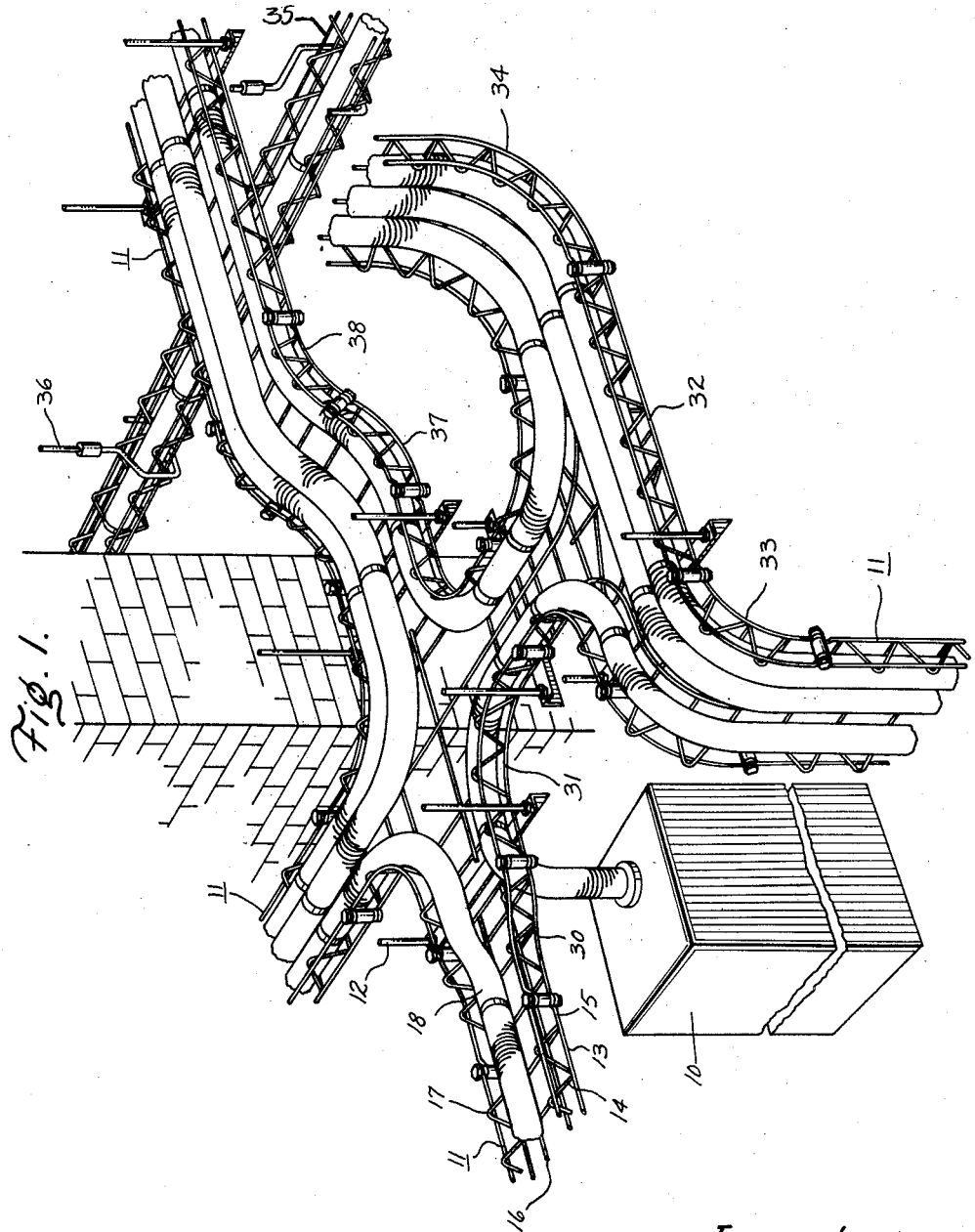

United States Patent Office 2,891,750
Patented June 23, 1959

2,891,750

CABLE SUPPORTING SYSTEM

Carl H. Bergquist, Monroe, Conn., assignor to General Electric Company, a corporation of New York Application October 1, 1956, Serial No. 613,280

6 Claims. (Cl. 248—58)

The present invention relates generally to a system for supporting electrical cables by means of suspended cable racks which are of novel construction.

At the present time, electrical cables are supported in three ways, namely, (1) suspended from poles or other spaced supports (2) enclosed in rigid electrical conduit which resembles steel pipe and (3) on cable racks which resemble ladders although they have a channel-shaped cross-section and are hung from above. The present invention resides in a cable rack system of novel wire construction which has many advantages over the known types now available on the market.

Interlocked armored cable is the principal type of cable that is used with cable racks at the present time since it affords the maximum amount of flexibility of design at the minimum cost of installation and maintenance. Cables which are supported on racks have higher current ratings than equivalent cables incased in conduit because the cables are better ventilated on the racks so that they run cooler during operation. Also, the inductive losses are reduced when using cable racks since the rack construction is less dense than rigid conduit. Cable racks are engineered and made in standard lengths and shapes in the factory so that it is not necessary to perform laborious manufacturing steps on the job as the cables are installed.

The cable rack system of the present invention is of welded steel wire construction where the racks are made in standard lengths of 12 feet with a width of 12 inches. Each rack is of shallow channel shape formed by a plurality of longitudinal stringers which are tied together by a plurality of transverse rungs. One preferred embodiment of this invention has a pair of longitudinal stringers at each side of the rack and one or more longitudinal stringers on the floor of the rack between the sides thereof. A rigid structure is obtained by forming the opposite ends of each rung into parallel portions of downturned V-shape which are to be attached to the longitudinal side stringers.

There are many unobvious results or advantages in making cable rack of wire construction, not the least of which is the fact that a rack of wire construction may be easily bent vertically (either up or down) with a special bending tool. This accomplishment eliminates the necessity for supplying special risers or bends for changing the elevation of the racks. Another important advantage is that it may be made as strong as the present-day ladder and basket type racks with a significant reduction in weight which brings it between the weight of aluminum and that of steel. Another advantage is that light weight transverse rungs may be spaced at the proper distance to prevent festooning of small wires and cables at a minimum cost while making it possible to drop the cable out at any point. If a transverse rung happened to be in the way of a cable which is to be brought down from the cable rack, it is possible to use a heavy wire cutter to snip the wire rung and enlarge the opening in the floor of the rack. Also, the rounded configuration of the wire facilities the ease of pulling the cable onto the rack because of the point contact between the cable and rack. Likewise, a simple clamp type connection may be utilized for joining adjacent rack sections without drilling bolt holes as in present-day constructions.

Accordingly, the principal object of this invention is to provide a cable rack of wire construction which forms a rigid cable supporting system while being of light weight and low cost.

A further object of this invention is to provide a cable rack of wire construction having a novel connection means for joining adjacent rack sections.

A further object of this invention is to provide a cable rack of wire construction which may be bent in a vertical plane with a special tool on the job so that the rack will clear an obstruction without using a special riser fitting.

A further object of this invention is to provide a cable rack of wire construction with transverse rungs in the floor of the rack which may easily be removed so that the cable may be brought in or dropped out at any point.

My invention will be better understood from the following description taken in connection with the accompanying drawings and its scope will be pointed out in the appended claims.

Figure 1 is an isometric view of a typical cable rack system according to my invention showing large size armored cable connected to switchgear or other control equipment located on the floor below the cable racks.

Figure 2 is a partial cross-sectional view showing the method of bolting the sides of two cable rack sections together.

Figure 3 is an enlarged isometric view showing adjacent sections of cable racks fastened together by the means of Figure 2 as well as sleeves telescoped over the free ends of the longitudinal stringers in the floor of the racks.

Referring in detail to the drawing and in particular to Figure 1, 10 represents switchgear or other control equipment used by large industrial plants and utilities as part of their electrical distribution system. The cable racks 11 of shallow channel shape which embody this invention are suspended by means of hangers 12 from the ceiling or other overhead supports of the building. A typical cable rack would be approximately 12 feet long and 12 inches wide while the sides are approximately 4 inches high. It will be understood, of course, that these dimensions are not critical limitations but are merely suggestive.

One of the main features of this invention is the fact that the cable rack is made of wire as best shown in Figure 3 in the form of a plurality of longitudinal stringers 13 and a plurality of transverse rungs 14 which tie the stringers together. In the preferred embodiment of this invention there are two vertically spaced side stringers 15 on each side of the rack and two intermediate stringers 16 spot welded to the top surface of the rungs 14 and spaced from each other as well as from the sides of the rack. The reason for locating the intermediate stringers 16 on the top of the rungs is to insure that the lower side stringer 15 will rest on the supporting surface of the hangers 12 of Figure 1. Thus the two supporting points of the rack are spaced as far apart as possible to reduce the tendency of the racks to twist and rock in the hangers. In order to get the maximum rigidity and the least amount of deflection for a given load on the rack, each transverse rung 14 is provided with parallel end portions 17 which are in the form of downturned V-members thereby forming with the bottom side stringer 15 an isosceles triangle. These end portions 17 are spot welded to the inside of the two side stringers 15 so that the interior of the rack 11 is as free from obstructions as possible, thereby making it easy to pull armored cable identified by the numeral 18 onto the racks. Usually it is desirable to fasten the cable to the racks by using a strap 19 to tie the cable to an underlying stringer 16.

One of the main advantages of a cable rack of wire construction is the ease of connecting adjacent rack sections together. This will be best understood with reference to Figures 2 and 3 of the drawings. It should be noted that both of the side stringers 15 terminate in an eye 20 which is bent outwardly into a horizontal ring so that the looped ends of adjacent rack sections may be aligned on a vertical axis for receiving a bolt 21. This type of connection is possible because the side stringers 15 of each cable rack section as shown in Figure 2 have the lower stringer at one end raised slightly as at 22 while at the opposite end of the same cable rack the upper side stringer 15 is formed down slightly as at 23. Thus the cable rack sections may be joined together so that the floors of the racks will lie in the same plane although the eyes 20 of the side stringers are adapted to mate together. A nut 24 is welded under the eye 20 of the lowermost stringer 15 of a connection such as shown in Figure 2 so that the bolt 21 and a bushing 25 located between the upper and lower side stringers 15 of a connection are the only loose members which are necessary in order to connect the sides of the adjacent cable racks together.

Support is given to the intermediate stringers 16 by using small coupling sleeves 26 telescoped over the free ends of the stringers 16 and preferably clamped thereto by means of a heavy crimping tool (not shown). It should be noted that this type of coupling means, illustrated in Figures 2 and 3 of the drawing, provides an unobstructed transition between adjacent rack sections which will not interfere with the cable that is to be pulled into the rack and supported thereby. Present-day cable racks having heavy extruded sections of aluminum or steel require splicing plates which must be bolted in a manner similar to steel girders in large buildings. This requires a great deal of time and effort and the resulting structure has the disadvantage of providing a series of bolt heads within the interior of the cable rack which might catch onto cable as it is being pulled onto the rack and cause damage and possible rejection of the cable.

Going back to Figure 1 of the drawing, different fittings have been illustrated to show some of the many catalog items which must be stocked by the manufacturer so that the complete system may be shipped to the customer making it unnecessary to construct special fittings on the job. A reducer section 30 is shown over the switchgear equipment 10 connecting the cable rack 11 at its right end with the crossover 31 which has four branches. The crossover 31 also connects with a T 32. Coming off of the left end of the T 32 is a vertical outside bend 33 which leads into a vertical cable rack 11. The right side of the T 32 has a vertical inside bend 34, it being understood that all of these fittings are connected together by the method shown in Figures 2 and 3 of the drawing.

When it is merely necessary to support a single large cable or several small cables, it is more economical to use a miniature cable rack or what is known in the industry as a cable trough such as is shown at 35 in Figure 1. This trough is made in a similar manner to a cable rack except that its width is approximately 4 inches wide. In view of its reduced size and, hence, light weight, smaller hangers 36 may be used for suspending the troughs from above. Oftentimes, it is necessary to change the elevation of a rack as is shown at 37 and 38 connecting the crossover 31 with the cable rack 11 that overlies the trough 35. The fitting 37 is a 45° vertical inside bend while the fitting 38 is a 45° vertical outside bend so that the cable may be carried from the crossover 31 over the trough 35 and beyond. While the drawings show fittings 37 and 38 for changing the elevation of the cable rack system, we have been successful in using a special bending tool for bending the rack in a vertical plane either up or down, which operation may be performed on the job thereby eliminating the necessity of ordering special fittings such as 37 and 38. This special bending tool will form the subject matter of a later copending application.

Having described above my invention of a novel lightweight cable rack of wire construction comprising a plurality of longitudinal stringers spot welded to a plurality of spaced transverse rungs having downturned V-shaped parallel ends, it will be understood by those skilled in this art that there are many advantages in this construction which are superior to all cable racks now available on the market. The ease of coupling adjacent rack sections together is of primary importance in practicing this invention. The ease of manufacture using low cost lightweight wire material and mass production methods of spot welding the wire stringers and rungs together have effected a substantial reduction in cost of manufacturing these cable racks without sacrificing the advantages of rigidity of the present-day designs.

Modifications of this invention will occur to those skilled in this art and it is to be understood, therefore, that this invention is not limited to the particular embodiments disclosed but that it is intended to cover all modifications which are within the true spirit and scope of this invention.

What I claim as new and desire to secure by Letters Patent of the United States is:

1. A cable supporting system comprising a channel-shaped rack of wire construction provided with a plurality of longitudinal stringers and a plurality of transverse rungs, the ends of each rung being parallel and of downturned V-shape for connection with the stringers forming the sides of the rack.

2. A cable supporting system comprising channel-shaped racks and fittings of wire construction provided with a plurality of longitudinal stringers and a plurality of transverse rungs, the sides of each rack having at least two stringers, one at the top and the other at the bottom, and at least one intermediate stringer on the top surface of the floor of the rack and spaced from the sides thereof, the ends of each rung being parallel and of downturned V-shape for connection with the side stringers so as to rigidify the assembly.

3. A cable supporting system such as recited in claim 2 wherein the ends of adjacent racks are arranged to be coupled together, the longitudinal stringers forming the sides of the rack terminating in eyes having a common vertical axis so that a bolt may be inserted therethrough for clamping adjacent sections of rack together.

4. A cable supporting system as recited in claim 3 wherein a sleeve member is telescoped over the ends of the intermediate stringers on the floor of the racks.

5. A cable supporting system comprising a channel-shaped rack of wire construction having a plurality of longitudinal stringers tied together by a plurality of transverse rungs, there being at least two vertically spaced stringers at each side of the rack and at least one intermediate stringer attached to the top surface of the midportion of the rungs, the ends of each individual rung are parallel and of downturned V-shape which are attached to the inner surfaces of the side stringers, the ends of the side stringers being formed as outside loops or eyes for receiving a bolt that connects two adjacent rack sections together, one end of each side stringer being slightly offset toward the adjacent side stringer of the same rack, the offsets at one end of a rack section being in the two lower side stringers and at the opposite end of the same rack section being in the two upper side stringers so that the floors of adjacent rack sections may be coupled together in a single plane, and bushing means between the vertically arranged eyes at a connection of two rack sections, and bolt members extending through the eyes and bushings to clamp these sections together.

6. A cable supporting system as recited in claim 5 wherein a sleeve member is telescoped over the ends of the intermediate stringers on the floor of the racks.

References Cited in the file of this patent

UNITED STATES PATENTS

| | | |
|---|---|---|
| 1,717,133 | Welsh | June 11, 1929 |
| 2,084,162 | Packard | June 15, 1937 |
| 2,122,985 | Lord | July 5, 1938 |
| 2,465,074 | Edge | Mar. 22, 1949 |
| 2,554,232 | Young | May 22, 1951 |
| 2,656,999 | Ullberg | Oct. 27, 1953 |
| 2,661,172 | Needham | Dec. 1, 1953 |